(12) United States Patent
Yokoyama et al.

(10) Patent No.: US 7,289,112 B2
(45) Date of Patent: Oct. 30, 2007

(54) PRESENTATION DEVICE

(75) Inventors: Junichi Yokoyama, Saitama (JP);
Mitsuyoshi Nishimura, Saitama (JP)

(73) Assignee: Fujinon Corporation, Saitama (JP)

(*) Notice: Subject to any disclaimer, the term of this patent is extended or adjusted under 35 U.S.C. 154(b) by 662 days.

(21) Appl. No.: 10/774,596

(22) Filed: Feb. 10, 2004

(65) Prior Publication Data

US 2004/0160668 A1 Aug. 19, 2004

(30) Foreign Application Priority Data

Feb. 13, 2003 (JP) ............................. 2003-035052

(51) Int. Cl.
*G09G 5/08* (2006.01)

(52) U.S. Cl. ...................... 345/178; 345/156; 345/173; 345/179

(58) Field of Classification Search ................ 345/178, 345/156, 173, 179
See application file for complete search history.

(56) References Cited

U.S. PATENT DOCUMENTS 7,027,041 B2 *   4/2006   Nishimura et al. .......... 345/178

FOREIGN PATENT DOCUMENTS

| JP | A 2002-17184 | 1/2002 |
| JP | A 2003-108305 | 4/2003 |

* cited by examiner

*Primary Examiner*—Richard Hjerpe
*Assistant Examiner*—Leonid Shapiro
(74) *Attorney, Agent, or Firm*—Oliff & Berridge, PLC

(57) ABSTRACT

A presentation device for generating a virtual screen used for performing a pointing operation, has a photographing section of which an angle of view can be adjusted by operating a zoom function and a pan-and-tilt mechanism, a monitor for a presenter, displaying an image photographed by the photographing section, and a control section. A mark for generating the virtual screen is set on a photographing range of the photographing section or the monitor, a virtual screen area having a predetermined size is set within the angle of view of the photographing section based on the mark, and the control section generates XY coordinates of the virtual screen on the virtual screen area.

4 Claims, 13 Drawing Sheets

PRESENTATION DEVICE

BACKGROUND OF THE INVENTION

1. Field of the Invention

The present invention relates to a presentation device which is advantageous for giving presentations in which a presenter explains the content of materials such as manuscripts and photographs to an audience while the materials are displayed on a display device such as a screen or a monitor.

2. Description of the Related Art

Lectures, explanations of goods, educational presentations, etc., are given while images of materials are displayed on a screen. These kinds of performances are called "presentations" hereinafter. In these presentations, a presenter indicates specific parts on images of materials projected on the screen by performing a pointing operation. Laser pointers emitting laser beams have generally been used in pointing operation methods. However, the laser beams are dangerous.

Therefore, the Applicant of the present invention previously proposed a presentation system in which a virtual screen is generated near a presenter, a camera photographs the state in which the presenter virtually performs a pointing operation on the virtual screen using an indication mark, and a point image is displayed at the position on an image projected on the screen, which corresponds to the position of the indication mark on image data, as described in Japanese Unexamined Patent Application Publication No. 2003-108305. In this proposal, there is no danger from the laser beams, it is possible to suppress shaking by image processing, and it is possible to vary the shape of the point image. In Japanese Unexamined Patent Application Publication No. 2002-17184 proposed by the Applicant, not only the presenter, but also, members of the audience may perform a pointing operation by using a virtual screen.

On a virtual screen, a presenter virtually performs a pointing operation by using the indication mark in the above manner, and XY coordinates are generated. The indication mark is composed of light emitted by a light pen. When an arbitrary position on the virtual screen is indicated by the indication mark, the position of the indication mark on the XY coordinates is calculated based on image data obtained by a camera photographing the indication mark, and a point image is displayed at a position on the screen, which corresponds to the calculated position. The method of generating the virtual screen is as follows. For example, a camera photographs the state in which light is emitted at two diagonal points. A rectangular virtual screen area having a diagonal line connecting two diagonal points to each other is zoomed in the camera angle of view. XY coordinates are generated on the virtual screen area, whereby the virtual screen area is set as a virtual screen.

In the above method of generating the virtual screen, the position of the presenter is not restricted, and it is also possible for members of the audience to perform a pointing operation, whereby the presentation can be made more flexible and other effects can be obtained. The size of the virtual screen is made to fit the size of the presenter or the audience. However, this method of generating the virtual screen is troublesome. Due to this, it is necessary to teach the audience the method in order for the audience to perform pointing operations. As a result, the presentation may not be performed smoothly. To overcome this disadvantage, it is thought that the virtual screen should be set so as to be fixed before the presentation. In this case, however, the size of the virtual screen cannot be changed, and it is troublesome to set the position of the fixed virtual screen, and it is thereby difficult for the presenter to use a fixed virtual screen.

SUMMARY OF THE INVENTION

An object of the present invention is to provide a presentation device which can facilitate generating a virtual screen used for performing point operations in presentations and can make presentations smoothly.

The present invention provides a presentation device for generating a virtual screen used for performing a pointing operation, comprising: a photographing section of which an angle of view can be adjusted by operating a zoom function and a pan-and-tilt mechanism, a monitor for a presenter, displaying an image photographed by the photographing section; and a control section, wherein a mark for generating the virtual screen is set on a photographing range of the photographing section or the monitor, a virtual screen area having a predetermined size is set within the angle of view of the photographing section based on the mark, and the control section generates XY coordinates of the virtual screen on the virtual screen area.

In the present invention, the virtual screen is placed on the image photographed by the photographing section. When the virtual screen is indicated by an indication mark, the position of the indication mark on the XY coordinates of the virtual screen is calculated based on the image data obtained by the photographing section photographing the indication mark and a point image is displayed at the position within a display range of a display device corresponding to the calculated position of the indication mark. The display device of the present invention may be a screen on which images are projected by a projector such as a liquid crystal projector, or a television monitor to which image data are input and images are displayed thereon.

According to the present invention, the mark for generating the virtual screen is set on the photographing section range or the monitor, the virtual screen area having a predetermined size is set within the angle of view of the photographing section based on the mark, and the control section generates the XY coordinates of the virtual screen on the virtual screen area. Therefore, it is unnecessary to set two diagonal points as reference points in the virtual screen generating space, and the virtual screen can thereby be easily set. In particular, when a member of an audience is targeted and the presenter operates the photographing section, the virtual screen can thereby be easily and swiftly generated near a member of an audience by the presenter and presentations can be made smoothly.

The mark may be a frame-like image displayed on the monitor. When the virtual screen generated by adjusting the angle of view of the photographing section is made to correspond with the frame-like image, the virtual screen area can be set. In this case, the position and the size of the frame-like image displayed on the monitor may be fixed or adjustable. Alternatively, the mark may be a light spot irradiated approximately on a target. For example, the light spot may be composed of light irradiated on the target or light emitted near the target by a predetermined optical device used by the target. In this case, the virtual screen area may be set by using the light spot photographed by the photographing section as a reference point.

The presentation device may further comprise a photographing section for the monitor (monitor photographing section) for photographing the monitor. In this case, the mark may be composed of one indication point or two diagonal indication points indicated on the monitor. The virtual screen area can be set within the angle of view of the photographing section (the photographing section photographing the virtual screen) by using the indication point or the diagonal indication points as one or two reference points.

DESCRIPTION OF THE PREFERRED EMBODIMENTS

Embodiments of the present invention will be described hereinafter with reference to the drawings.

(1) First Embodiment

Figure 1:
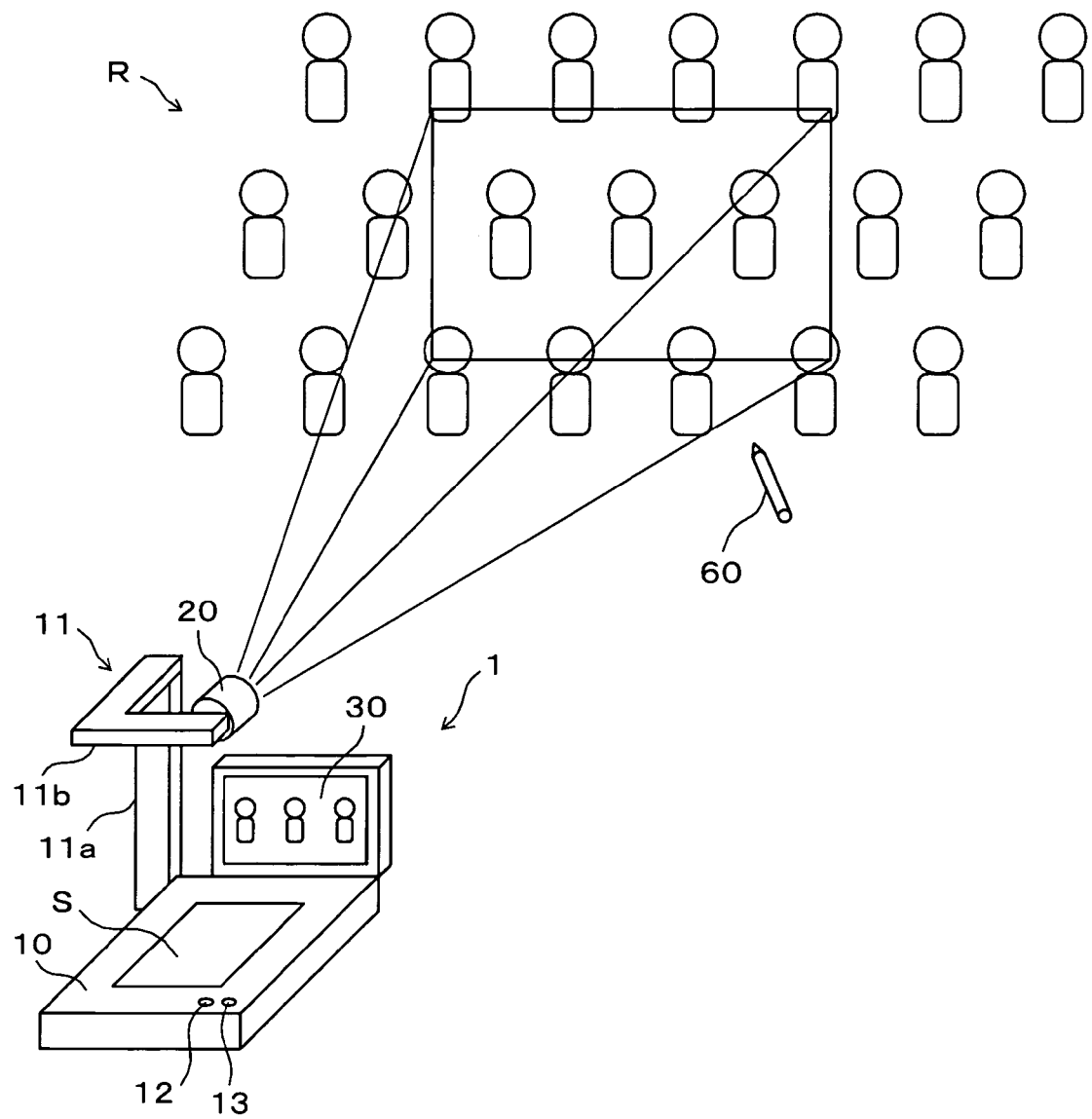
FIG. 1 is a schematic diagram showing a state in which a pointing operation is performed using a material presentation device in the first to the third embodiments according to the present invention.

In FIG. 1, reference numeral 1 denotes a material presentation device (presentation device). The material presentation device 1 is equipped with a material mounting pedestal 10 on which a material S is mounted, a photographing section 20 supported on the material mounting pedestal 10 via an arm 11, and a monitor 30 for a presenter. The material presentation device 1 has a lamp (not shown) illuminating the material S mounted on the material mounting pedestal 10. The arm 11 is composed of a support portion 11a vertically provided at the left back end portion of the material mounting pedestal 10 and a horizontal portion 11b fixed on the upper end portion of the support 11a. The horizontal portion 11b has an L-shape. The leading end of the horizontal portion 11b is positioned approximately on the center of the material mounting pedestal 10. The photographing section 20 is mounted thereon.

A monitor 30 is connected with the back end portion of the material mounting pedestal 10 via a hinge mechanism so as to be openable and closeable. FIG. 1 shows an open state of the monitor 30. In the open state of the monitor 30, the screen thereof faces forward and is viewed by the presenter. The open angle of the monitor 30 can be appropriately adjusted by hand.

Figure 2:
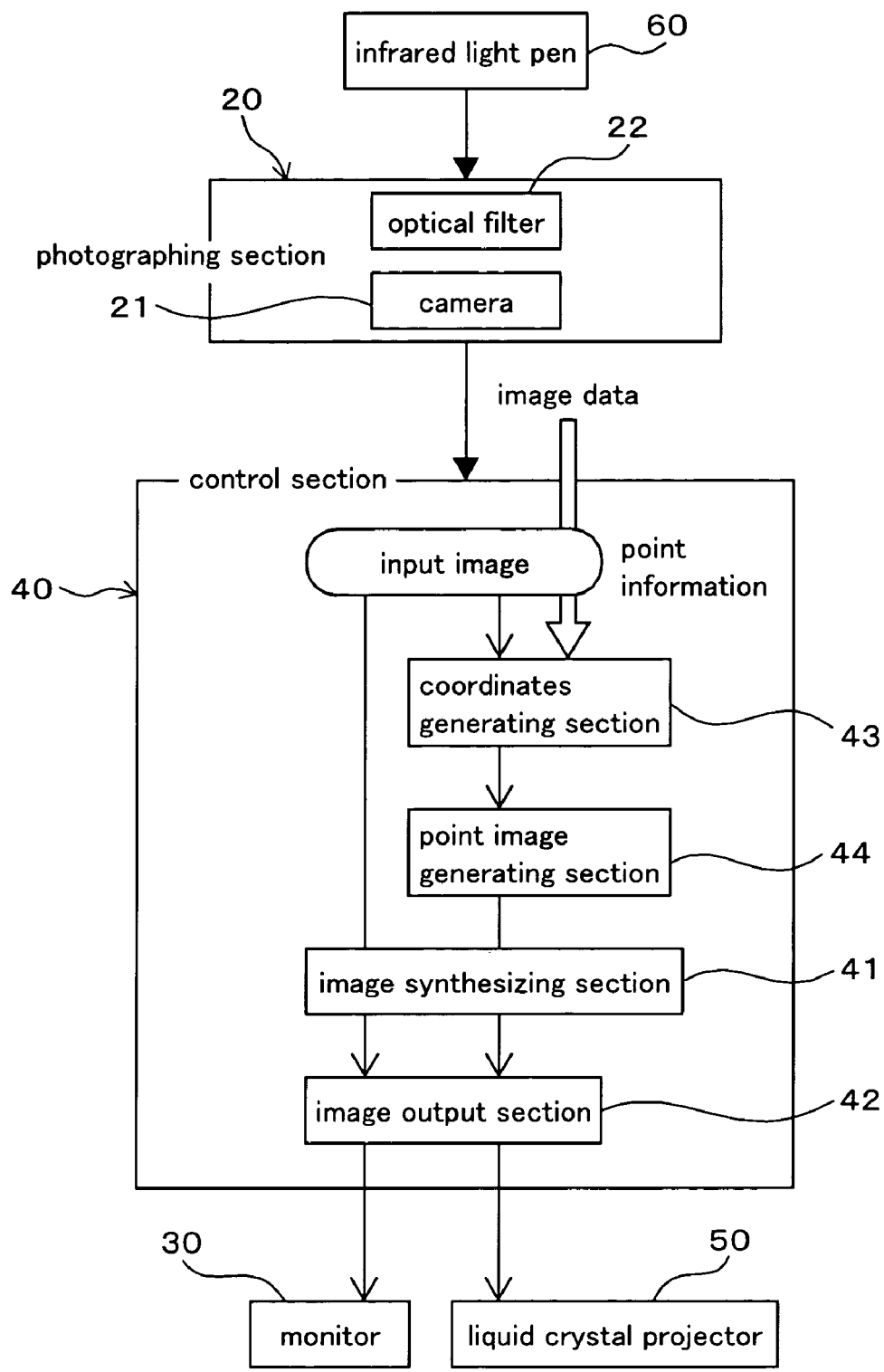
FIG. 2 is a functional block diagram schematically showing a structure and a function of the material presentation device in the first to the third embodiments according to the present invention.

As shown in FIG. 2, the photographing section 20 is equipped with a camera 21 having a zoom function and an optical filter 22. The photographing section 20 is mounted so that an object direction extends downward to the material mounting pedestal 10 and can be tilted forward and backward and can be panned left and right by operating a pan-and-tilt mechanism. The pan-and-tilt mechanism and the zoom function of the photographing section 20 are operated by hand. The optical filter 22 allows the camera 21 to photograph only infrared light, which is invisible. The optical filter 22 is removably provided in the photographing optical path of the camera 21 by hand. In the following description, the state in which the optical filter 22 is removed from the photographing optical path of the camera 21 is defined as a visible light photographing state of the photographing section 20 and the state in which the optical filter 22 is provided therein is defined as an infrared light photographing state of the photographing section 20. An image photographed by the photographing section 20 is output to a liquid crystal projector 50 and a monitor 30 via an image synthesizing section 41 and an image input section 42. The image photographed by the photographing section 20 is projected from the liquid crystal projector 50 to a screen (not shown). A control section 40 is, for example, provided in the material mounting pedestal 10.

In FIG. 1, reference numeral 60 denotes a light pen used for performing a pointing operation. A light emitting section composed of a light emitting diode (LED) is provided at the tip end of the light pen 60. When a switch of the light pen 60 is pressed, the light emitting section emits light including infrared light. A pointing operation can be performed by using the light pen 60 so that a point image is displayed at the position in the image projected on the screen, which corresponds to the position of light emitted by the light emitting section. The pointing function is executed by the control section 40.

As the above-described, the image photographed by the photographing section 20 is output to the liquid crystal projector 50 and the monitor 30. When an image switching switch 12 provided on the material mounting pedestal 10 is pressed so as to be turned ON, the image photographed by the photographing section 20 is output to the liquid crystal projector 50 as a static image. On the other hand, a frame image (frame-like image, mark: indicated by reference numeral 71 in FIG. 4) for generating a virtual screen is synthesized with the real time image photographed by the photographing section 20, and the synthesized image is displayed on the monitor 30. The position and the size of the frame image displayed on the monitor 30 may be fixed or be arbitrarily adjustable. A virtual screen generating switch 13 is provided on the material mounting pedestal 10. When the virtual screen generating switch 13 is pressed, a virtual screen for performing a pointing operation, which corresponds to the frame image 71, is generated.

Figure 3:
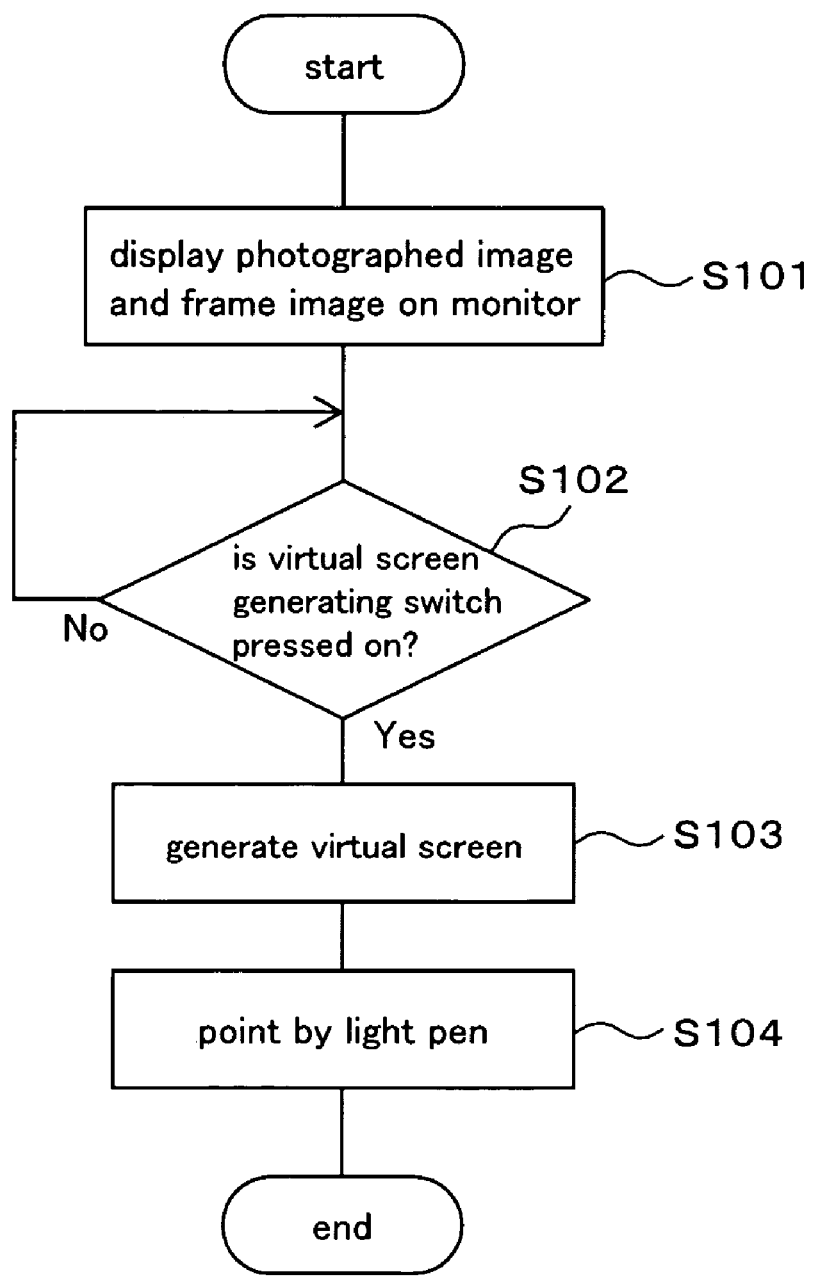
FIG. 3 is a flow chart showing a virtual screen generating method in the first embodiment according to the present invention.
Figure 4A:
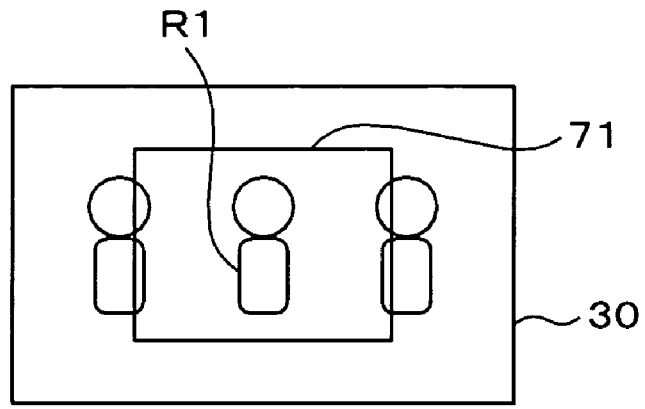
FIGS. 4A to 4C are monitor images showing the virtual screen generating method in the first embodiment according to the present invention.
Figure 4B:
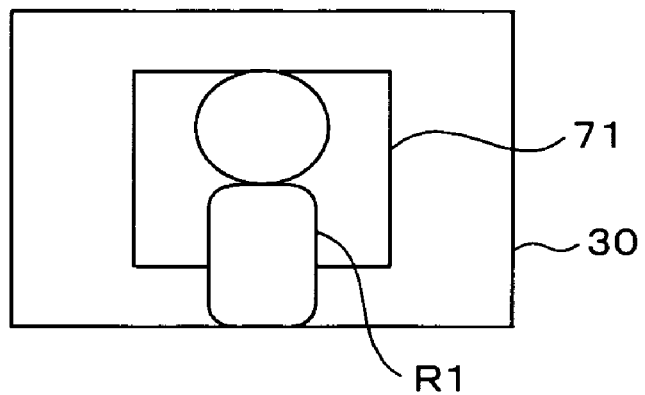
Figure 4C:
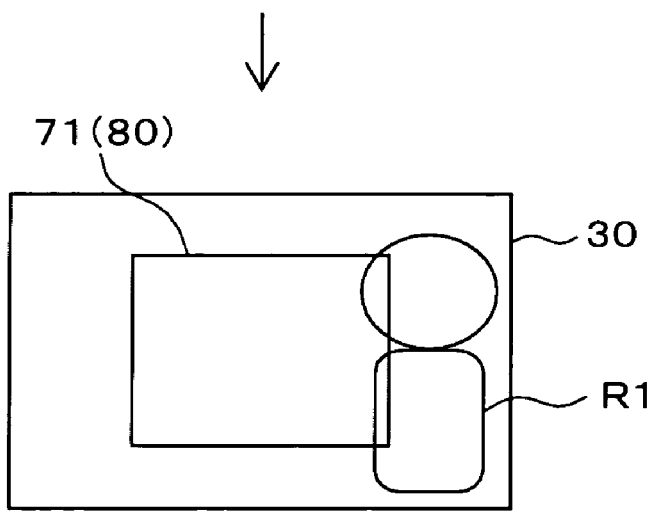

When a presentation is given by using the material presentation device 1, the material S is placed on the material mounting pedestal 10, the photographing section 20 is set in the visible light photographing state, the object direction is directed to the material mounting pedestal 10, and the image switching switch 12 is turned OFF. The material S is photographed by the photographing section 20 and an image photographed (material image) by the photographing section 20 is projected from the liquid crystal projector 50 onto the screen. The presenter then shows the audience R the material image projected onto the screen and explains the content of the material image to the audience R. The presenter or a member of the audience R can perform a pointing operation on the screen by using the light pen 60. Hereinafter, actions in a pointing operation, for example, performed by a member of the audience R, are described. FIG. 3 shows from the state of generating the virtual screen to the state of performing a pointing operation. FIGS. 4A to 4C shows images displayed on the monitor 30.

The presenter presses on the image switching switch 12, whereby the material image is projected as a static image from the liquid crystal projector onto the screen, and the image made by synthesizing the real time image photographed by the photographing section 20 with the frame image 71 is displayed on the monitor 30 (in step S101). The control section 40 checks whether or not the virtual generating screen switch 13 is pressed so as to be turned ON (in step S102). The presenter appropriately operates the pan-and-tilt mechanism so as to direct the photographing section 20 to the audience R while checking the monitor 30. In this state, as shown in FIG. 4A, the image of the audience R is displayed on the monitor 30 and is synthesized with the frame image 71.

Next, the presenter increases the zoom magnification of the photographing section 20, thereby roughly setting the angle of view thereof so as to fit the size of a member R1 of the audience R as shown in FIG. 4B. The presenter makes fine adjustments of the angle of view thereof so as to place the frame image 71 on the side of the member R1 of the audience R (on the right side of the member R1 of the audience R in FIG. 4C). Next, the presenter presses the virtual screen generating switch 13. The control section 40 detects that the virtual screen generating switch 13 is turned ON (in step S102) and generates XY coordinates on a virtual screen area designated by the frame image 71 by using the described image processing system, whereby a virtual screen 80 is generated (in step S103). Next, the presenter turns the photographing section 20 to the infrared light photographing state and the member R1 of the audience performs a pointing operation (in step S104).

The member R1 of the audience points to the virtual screen 80 using the light pen 60 emitting light so as to perform a pointing operation. In this case, the optical filter 22 is placed on the photographing optical path, whereby only the position of the light emitting section of the light pen 60 is photographed by the photographing section 20 and the coordinates of the light emitting section on the virtual screen 80 are calculated one by one by a coordinates generating section 43 in the control section 40, based on the image data on the photographed image thereof. A point image is generated by a point image generating section 44 at the calculated coordinates of the light emitting section. The point image is input into the image synthesizing section 41 and is synthesized with the material image thereby. As a result, the material image synthesized with the point image is output to the liquid crystal projector 50 and is projected therefrom onto the screen. While watching the point image projected onto the screen, the member R1 of the audience positions the light emitting section of the light pen 60 on the virtual screen 80 and performs a pointing operation at a required position thereon.

According to the first embodiment, it is unnecessary for two diagonal points as reference points to be set in the virtual screen generating space, and the virtual screen 80 can thereby be easily set. In particular, the virtual screen can 80 be generated easily and swiftly near to the audience R by the presenter, and presentations can thereby be made smoothly.

(2) Second Embodiment

Figure 5:
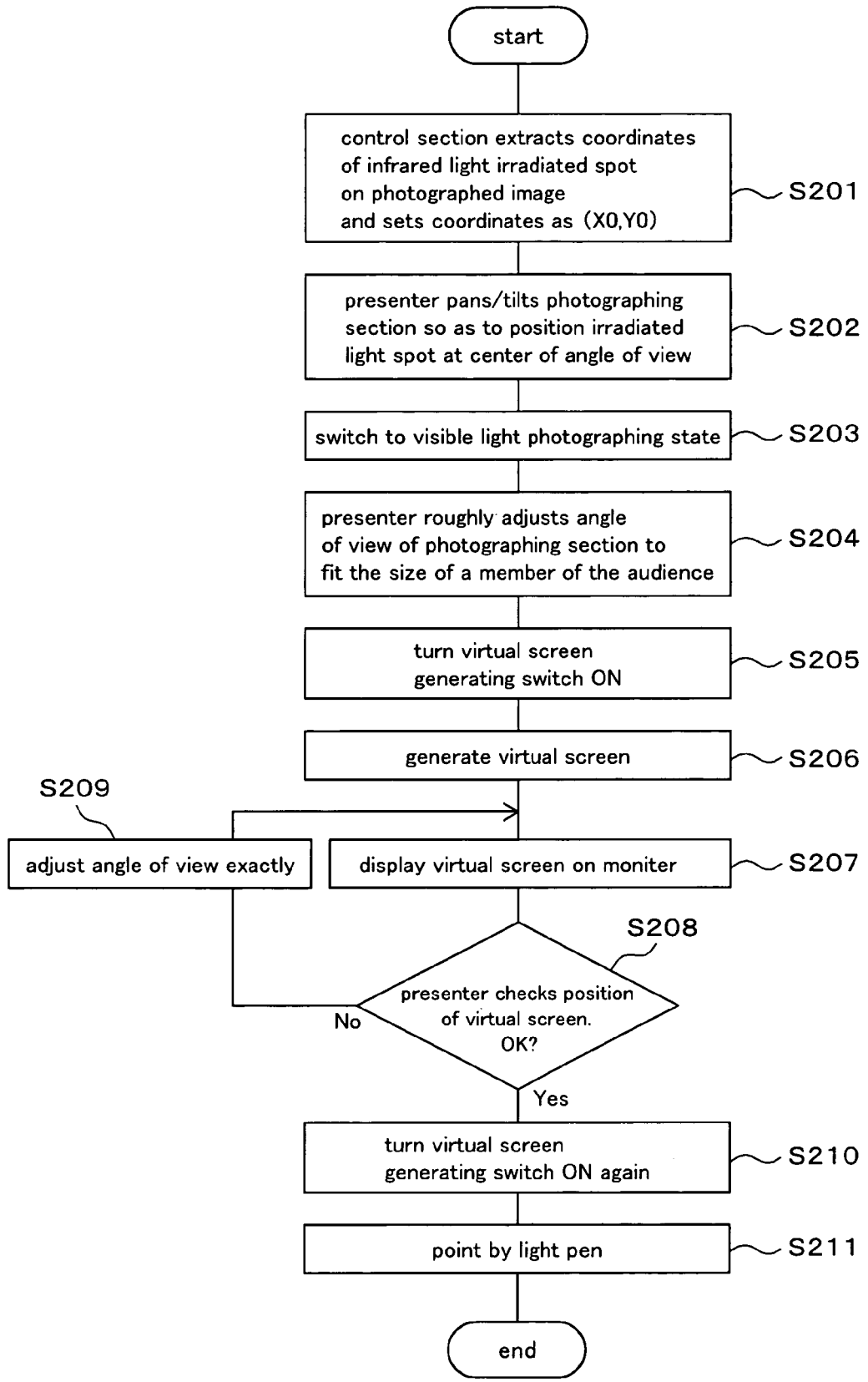
FIG. 5 is a flow chart showing a virtual screen generating method in the second embodiment according to the present invention.

In the second embodiment, a virtual screen is generated near member R1 of the audience based on infrared light irradiated on the member R1 of the audience instead of displaying the frame image on the monitor 30 in the first embodiment. The virtual screen generating method in the second embodiment is described hereinafter with reference to the flow chart in FIG. 5 and monitor images in FIGS. 6A to 6C.

Figure 6A:
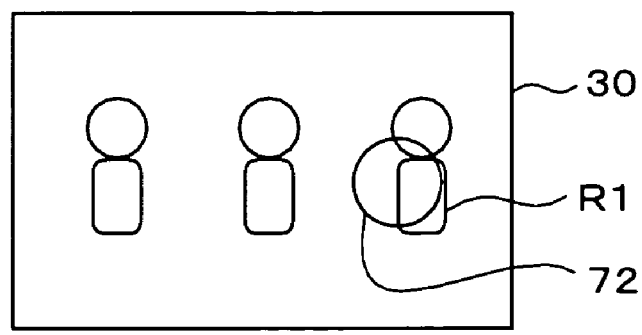
FIGS. 6A to 6C are monitor images showing the virtual screen generating method in the second embodiment according to the present invention.

The presenter sets the photographing section 20 in the visible light photographing state, as shown in FIG. 6A, directs the photographing section 20 to the audience R, and sets so that infrared light is irradiated onto the member R1 of the audience R performing a pointing operation. Although the audience R is shown so as to facilitate understanding of the virtual screen generating process in FIG. 6A, the audience R is not actually displayed on the monitor 30 since the optical filter 22 is placed in the photographing optical path. Next, the presenter presses the virtual screen generating switch 13, whereby the control section 40 extracts the center coordinates (reference point) of the infrared light irradiated spot (mark, reference point) 72 on the photographed image and sets the center coordinates thereof as coordinates (X0, Y0) (in step S201). The presenter appropriately pans and tilts the photographing section 20 so as to position light irradiated spot 72 at the center of the angle of view of the photographing section 20, that is, at the center of the monitor 30, while watching the monitor 30 (in step S202).

Figure 6B:
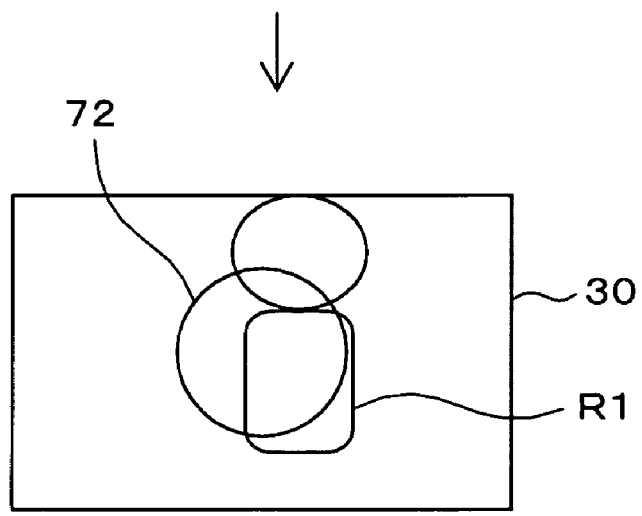
Figure 6C:
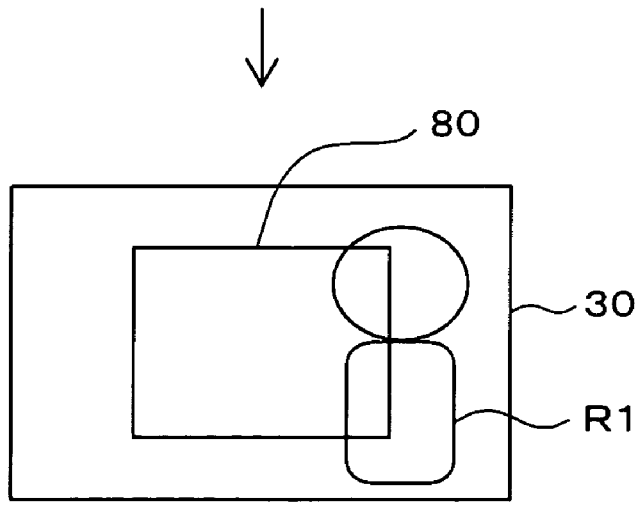

Next, the presenter turns the photographing section 20 to the visible light photographing state (in step S203). The presenter increases the zoom magnification of the photographing section 20 while watching the monitor 30, thereby roughly setting the angle of view of the photographing section 20 so as to place a virtual screen at the appropriate position, whereby the angle of view thereof fits the size of the member R1 as shown in FIG. 6B (in step S204). In this case, the appropriate position of the virtual screen is on the side of the member R1. The presenter presses the virtual screen generating switch 13 so that the virtual screen generating switch 13 is turned ON (in step S205). The control section 40 detects that the virtual screen generating switch 13 is turned ON and generates a virtual screen 80 on the side of the member R1 (in step S206), whereby the virtual screen 80 is displayed on the monitor 30 as shown in FIG. 6C (in step S207).

Next, the presenter checks whether or not the position of the virtual screen 80 is desirable (in step S208). When the position of the virtual screen 80 is not desirable, the presenter makes fine adjustments of the angle of view of the monitor photographing section 20 (in step S209). When the position of the virtual screen 80 is desirable, the presenter turns the virtual screen generating switch 13 ON again (in step S210), whereby the virtual screen 80 is fixed on the side of the member R1. The member R1 faces the virtual screen 80 and performs a pointing operation using the light pen 60 (in step S211).

(3) Third Embodiment

Figure 7:
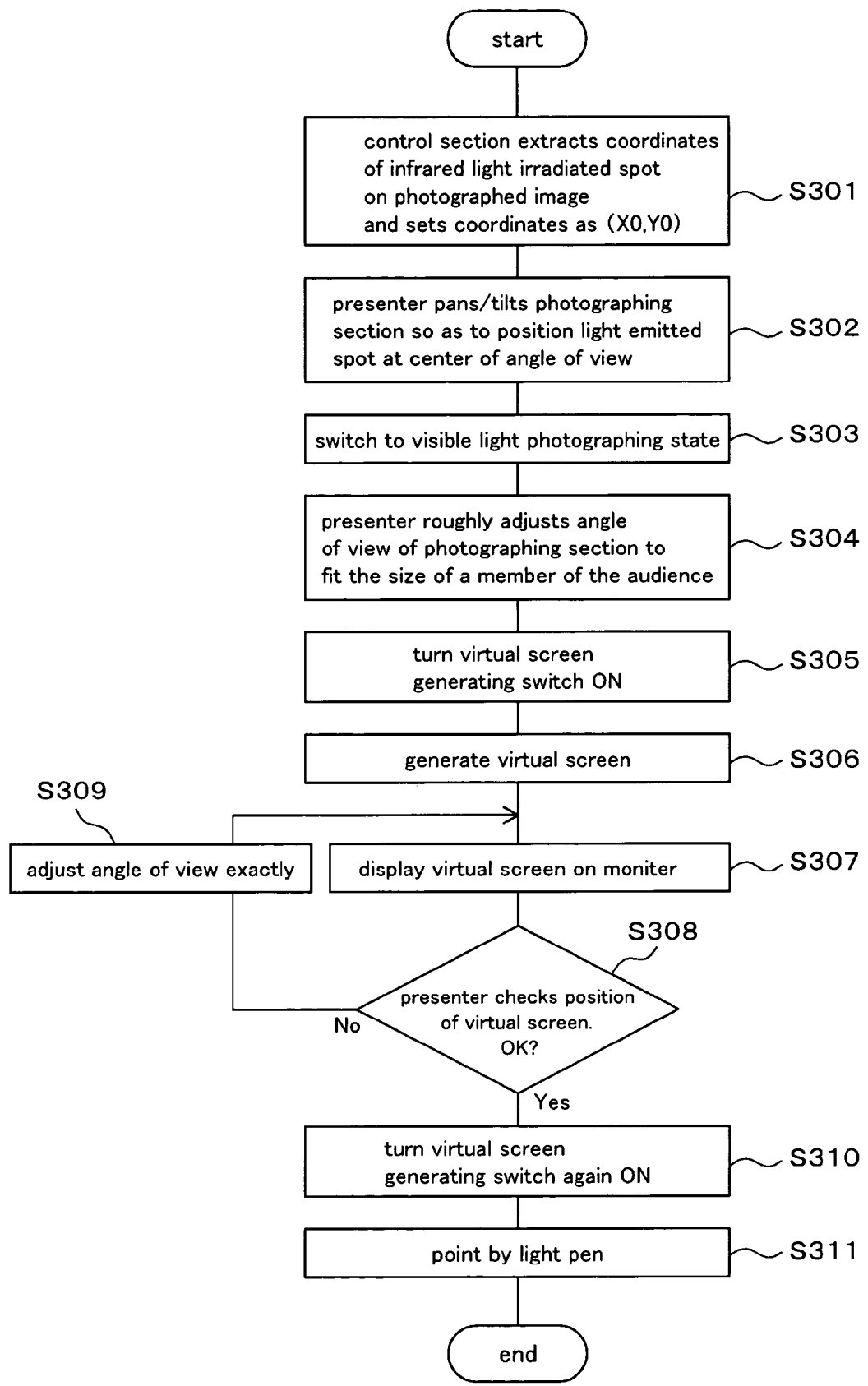
FIG. 7 is a flow chart showing a virtual screen generating method in the third embodiment according to the present invention.
Figure 8A:
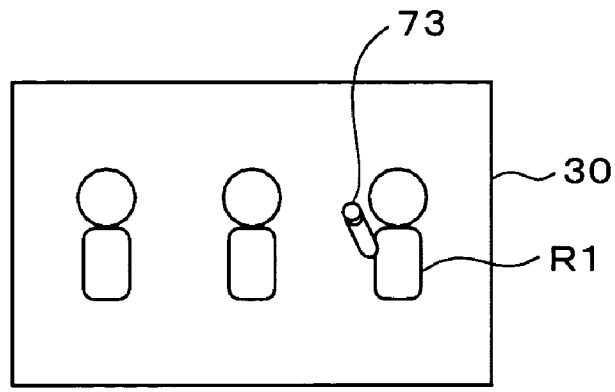
FIGS. 8A to 8C are monitor images showing the virtual screen generating method in the third embodiment according to the present invention.

In the third embodiment, the virtual screen is generated near the member R1 based on light irradiated by the light pen 60 used by the member R1 instead of irradiating infrared light on the member R1 in the second embodiment. The virtual screen generating method in the third embodiment is described hereinafter with reference to the flow chart in FIG. 7 and monitor images in FIGS. 8A to 8C.

The presenter sets the photographing section 20 in the infrared light photographing state, directs the photographing section 20 to the audience R, and the member R1 of the audience R causes the light pen 60 to emit light. Reference numeral 73 denotes the light emitting point of the light pen 60. Next, the presenter presses the virtual screen generating switch 13, whereby the control section 40 extracts the center coordinates (reference point) of the light emitting point 73 on the photographed image and sets the center coordinates as the coordinates (X0, Y0) (in step S301). Next, the presenter appropriately pans and tilts the photographing section 20 so as to position light emitting point 73 at the center of the angle of view of the photographing section 20 (in step S302).

Figure 8B:
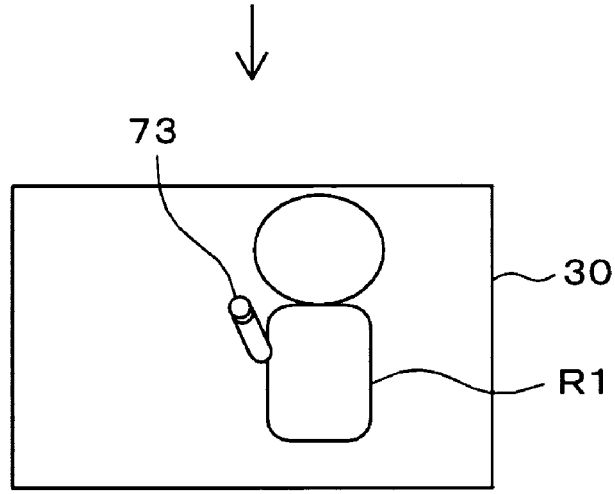
Figure 8C:
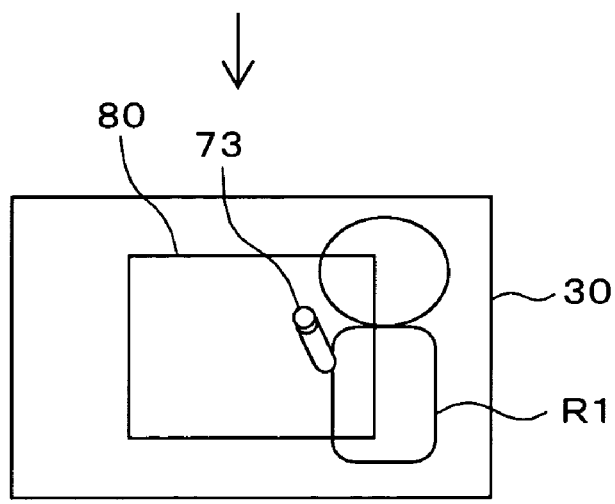

Next, the presenter turns the photographing section 20 to the visible light photographing state (in step S303) and magnifies the zoom magnification of the photographing section 20 while watching the monitor 30, thereby roughly setting the angle of view thereof so as to fit the size of the member R1 as shown in FIG. 8B, whereby a virtual screen is placed at the appropriate position (in step S304). The presenter presses the virtual screen generating switch 13 so that the virtual screen generating switch 13 is turned ON (in step S305). The control section 40 detects that the virtual screen generating switch 13 is turned ON and generates a virtual screen 80 on the side of the member R1 (in step S306), whereby the virtual screen 80 is displayed on the monitor 30 as shown in FIG. 8C (in step S307).

Hereinafter, in the same manner as in the above second embodiment, the presenter makes fine adjustments of the angle of view of the photographing section 20, whereby the virtual screen 80 is fixed on the side of the member R1 (in steps S308 to S310). The member R1 performs a pointing operation with respect to the virtual screen 80 using the light pen 60 (in step S311).

(4) Fourth Embodiment

Figure 9:
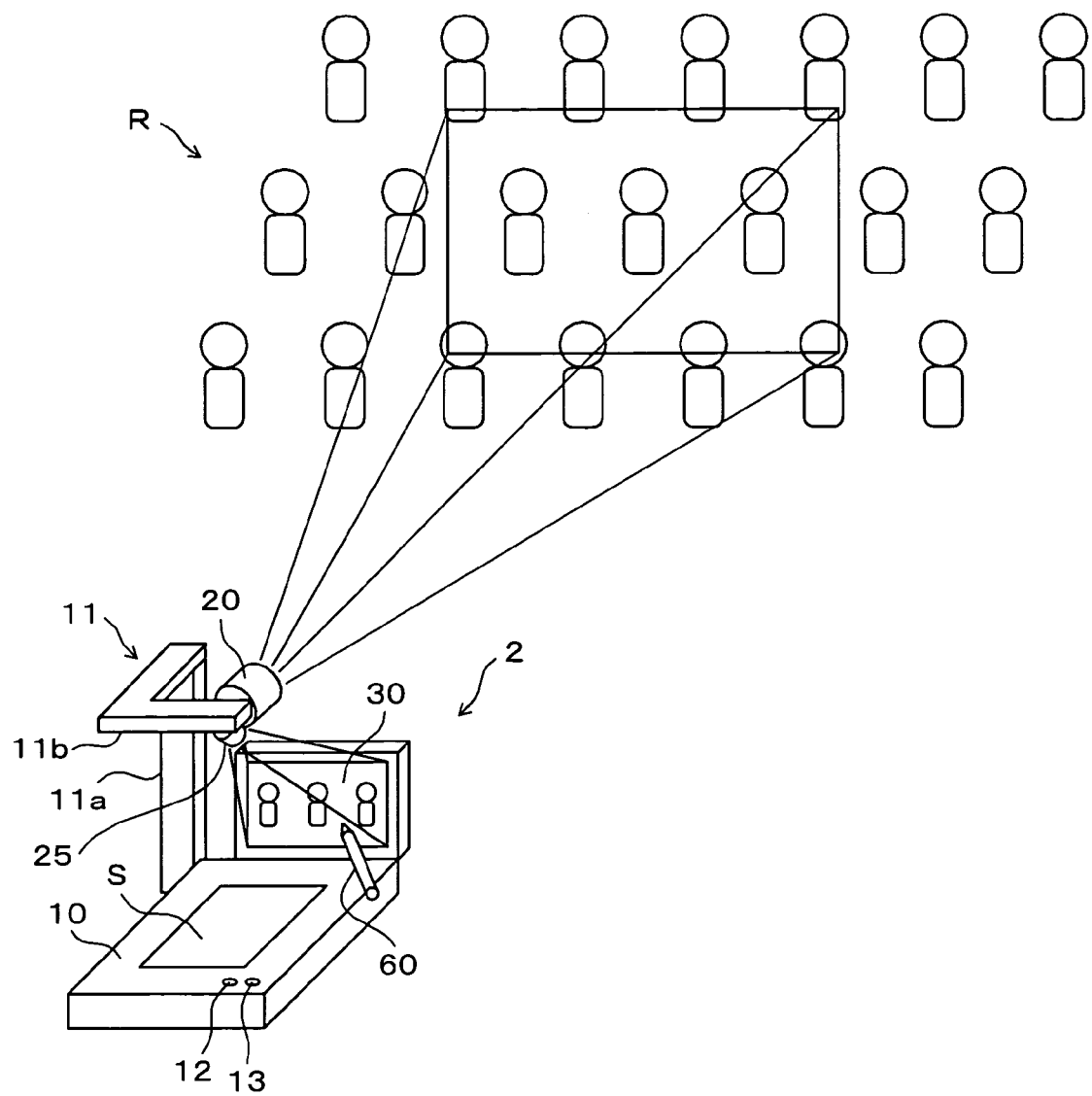
FIG. 9 is a schematic diagram showing a state in which a pointing operation is performed using a material presentation device in the fourth and fifth embodiments according to the present invention.

FIG. 9 is a schematic diagram showing a state in which a pointing operation is performed using a material presentation device 2 in the fourth embodiment. The material presentation device 2 is composed by adding a photographing section 25 for the monitor 30 (monitor photographing section) to the material presentation device 1 shown in FIG. 1. The photographing section 25 is provided at the leading end of the arm 11 so that the object direction is directed to the monitor 30. The image photographed by the photographing section 25 is input into the control section 40. Hereinafter the photographing section 20 directed to the audience R is referred to simply as the "main photographing section" ("virtual screen photographing section") and the photographing section 25 photographing the monitor 30 is referred to simply as the "monitor photographing section". In this case, an optical filter allowing the monitor photographing section 25 to photograph only infrared light is placed in the photographing optical path thereof. Since an optical filter is unnecessary for the main photographing section 20, the optical filter need not be provided in the main photographing section 20.

Figure 10:
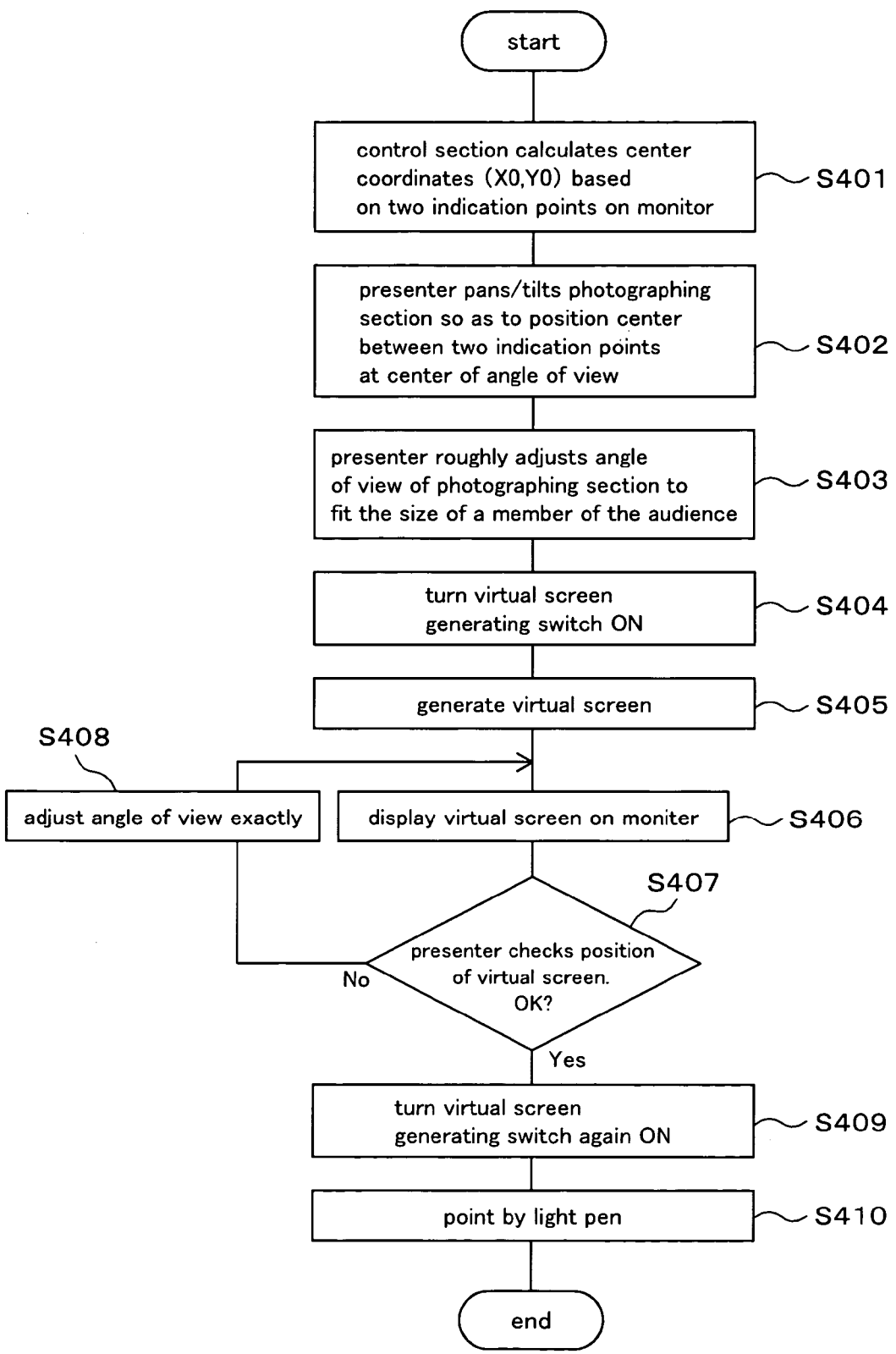
FIG. 10 is a flow chart showing a virtual screen generating method in the fourth embodiment according to the present invention.

In the fourth embodiment, the presenter indicates two diagonal indication points of the monitor 30 using the light pen 60 and a virtual screen is generated near the member R1 based on the two diagonal points photographed by the monitor photographing section 25. The virtual screen generating method in the fourth embodiment is described hereinafter with reference to the flow chart in FIG. 10 and monitor images in FIGS. 11A and 11B.

Figure 11A:
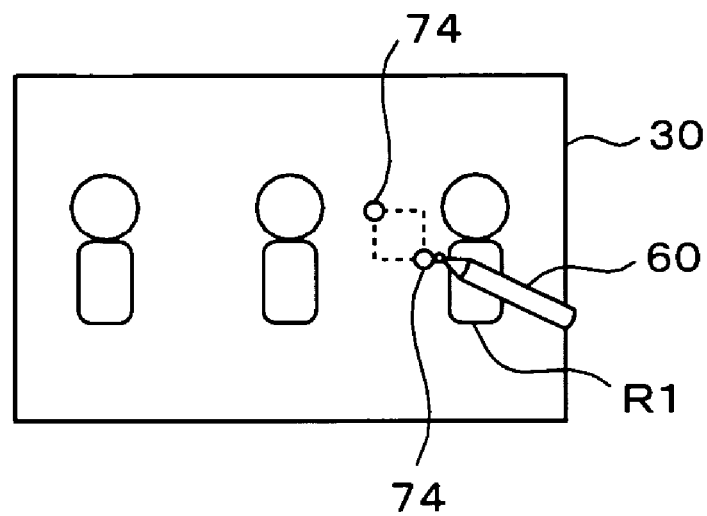
FIGS. 11A and 11B are monitor images showing the virtual screen generating method in the fourth embodiment according to the present invention.

The presenter sets the main photographing section 20 in the visible light photographing state and directs the photographing section 20 to the audience R. The audience R is displayed on the monitor 30. The presenter sets two diagonal points as indication points 74 (marks, reference points) near the member R1 of the audience R on the monitor 30, performing a pointing operation, and makes the light pen 60 emit light at the indication points 74. FIG. 11A shows this state on the monitor 30. The diagonal indication points 74 are photographed by the monitor photographing section 25. Next, the presenter presses the virtual screen generating switch 13, whereby the control section 40 recognizes the diagonal indication points 74 based on the image data obtained by the monitor photographing section 25 and calculates the center of the diagonal line between two indication points 74 as the coordinates (X0, Y0) (in step S401). Next, the presenter appropriately pans and tilts the main photographing section 20 so as to position the center of the diagonal line between two indication points 74 (in step S402).

Figure 11B:
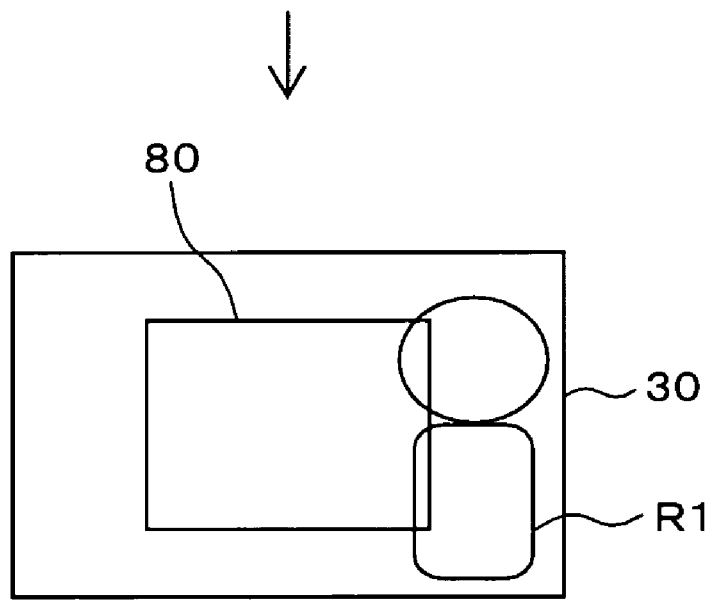

Next, the presenter increases the zoom magnification of the main photographing section 20 while watching the monitor 30, thereby roughly setting the angle of view thereof to fit the size of the member R1, whereby the virtual screen is placed at the appropriate position (in step S403). The presenter presses the virtual screen generating switch 13 so that the virtual screen generating switch 13 is turned ON (in step S404). The control section 40 detects that the virtual screen generating switch 13 is turned ON and generates the virtual screen 80 on the side of the member R1 (in step S405) and causes the monitor 30 to display the virtual screen 80 as shown in FIG. 11B (in step S406). Hereinafter, in the same manner as the above second and third embodiments, the presenter makes fine adjustments of the angle of view of the main photographing section 20, whereby the virtual screen 80 is fixed on the side of the member R1 (in steps S407 to S409). The member R1 performs a pointing operation with respect to the virtual screen 80 using the light pen 60 (in step S410).

(4) Fifth Embodiment

Figure 12:
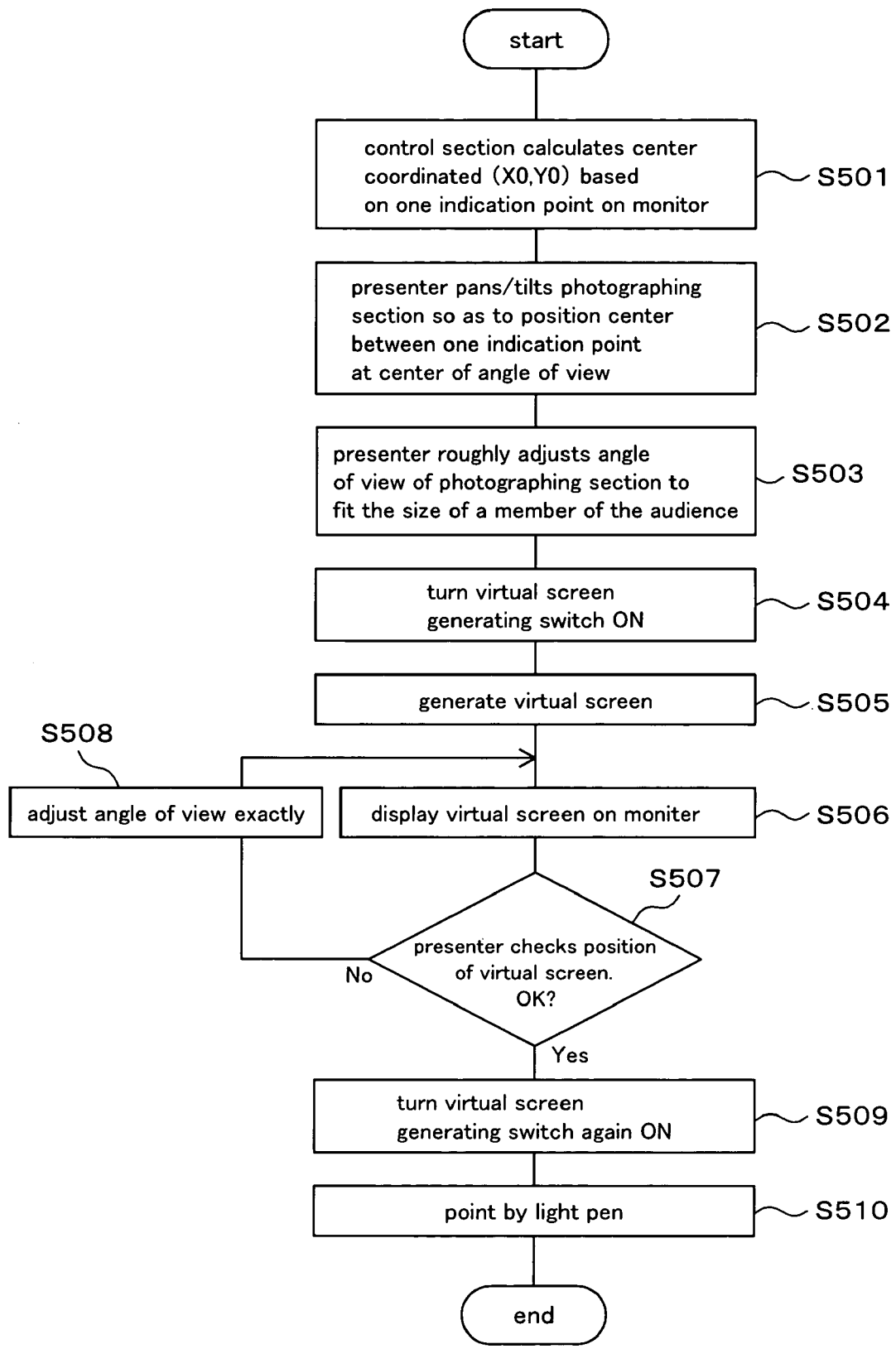
FIG. 12 is a flow chart showing a virtual screen generating method in the fifth embodiment according to the present invention.

In the fifth embodiment, the virtual screen is generated near the member R1 based on one indication point composed of light emitted on the monitor 30 by the light pen 60 instead of the diagonal indication points 74 in the fourth embodiment. The virtual screen generating method in the fifth embodiment is described hereinafter with reference to the flow chart in FIG. 12 and monitor images in FIGS. 13A to 13C.

The presenter sets the main photographing section 20 in the visible light photographing state and directs the main photographing section 20 to the audience R. The audience R is displayed on the monitor 30. The presenter makes the light pen 60 emit light on the member R1 of the audience R on the monitor 30, which performs a pointing operation, thereby setting the light emitting point as an indication point 75

Figure 13A:
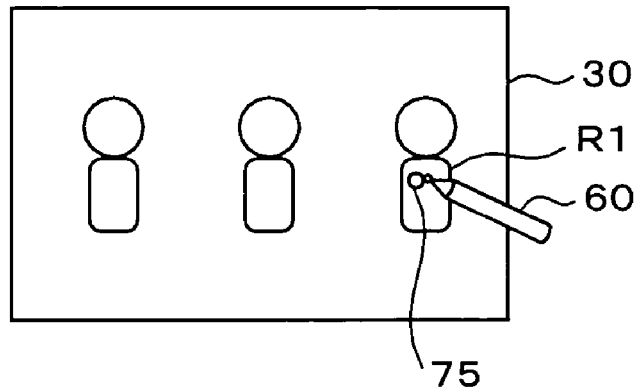
FIGS. 13A to 13C are monitor images showing the virtual screen generating method in the fifth embodiment according to the present invention.
Figure 13B:
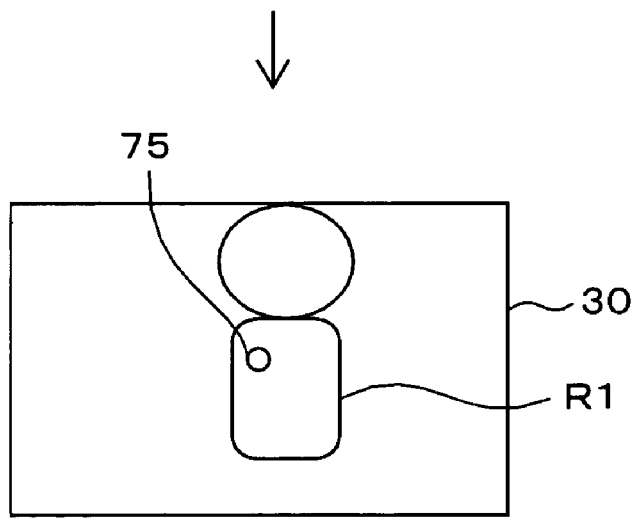

(mark, reference point). FIG. 13A shows this state on the monitor 30. The monitor 30 displaying the photographed image is photographed by the monitor photographing section 25. Next, the presenter presses the virtual screen generating switch 13, whereby the control section 40 recognizes the indication points 75 based on the image data obtained by the monitor photographing section 25 and extracts the coordinates of the indication point 75, thereby setting the coordinates as the coordinates (X0, Y0) (in step S501). Next, the presenter appropriately pans and tilts the main photographing section 20 so as to position the center of the indication point 75 (in step S502).

Figure 13C:
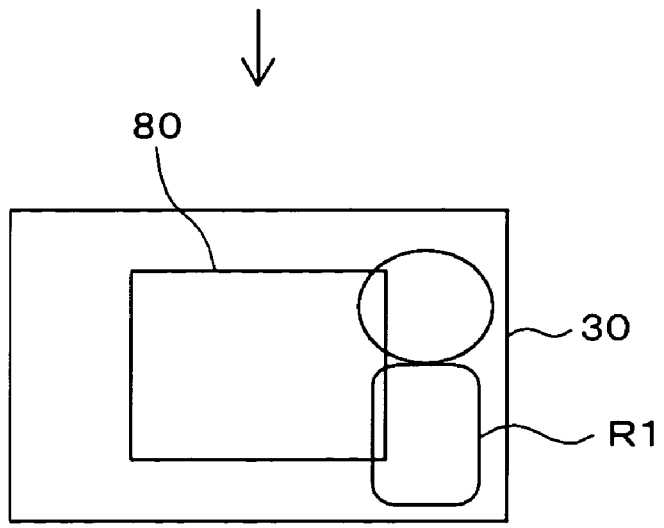

Next, the presenter increases the zoom magnification of the main photographing section 20 while watching the monitor 30, thereby roughly setting the angle of view thereof to fit the size of the member R1, whereby a virtual screen is placed at the appropriate position (in step S503). The presenter presses the virtual screen generating switch 13 so that the virtual screen generating switch 13 is turned ON (in step S504). The control section 40 detects that the virtual screen generating switch 13 is turned ON and generates a virtual screen 80 on the side of the member R1 (in step S505), whereby the virtual screen 80 is displayed on the monitor 30 as shown in FIG. 13C (in step S506). Hereinafter, in the same manner as in the above second to fourth embodiments, the presenter makes fine adjustments of the angle of view of the main photographing section 20, whereby the virtual screen 80 is fixed on the side of the member R1 (in steps S507 to S509). The member R1 performs a pointing operation with respect to the virtual screen 80 using the light pen 60 (in step S510).

In generating the virtual screen, a distance from the photographing section 20 to the member R1 is measured and the virtual screen area is set on the angle of view of the photographing section 20 based on the measured distance instead of adjusting the zoom magnification and panning/tilting of the presenter.

What is claimed is:

1. A presentation device for generating a virtual screen used for performing a pointing operation, comprising:
    a photographing section of which an angle of view can be adjusted by operating a zoom function and a pan-and-tilt mechanism,
    monitor for a presenter, displaying an image photographed by the photographing section, and
    a control section,
    wherein a mark for generating the virtual screen is set on a photographing range of the photographing section or the monitor, a virtual screen area having a predetermined size is set within the angle of view of the photographing section based on the mark, and the control section generates XY coordinates of the virtual screen on the virtual screen area,
    wherein the presentation system further comprises:
    a monitor photographing section for photographing the monitor,
    wherein the mark is composed of an indication point or two diagonal indication points indicated on the monitor, and the virtual screen area of which the indication point or the diagonal indication points are used as one or two references points is set within the angle of view of the photographing section based on the indication point or the diagonal indication points.

2. The presentation device according to claim 1, wherein the mark is composed of a frame-like image of which the position and the size displayed on the monitor is fixed or adjustable, and the virtual screen area is made to correspond with the frame-like image, whereby the virtual screen area is set.

3. A presentation device for generating a virtual screen used for performing a pointing operation, comprising:
    a photographing section of which an angle of view can be adjusted by operating a zoom function and a pan-and-tilt mechanism,
    a monitor for a presenter, displaying an image photographed by the photographing section, and
    control section,
    wherein a mark for generating the virtual screen is set on a photographing range of the photographing section or the monitor, a virtual screen area having a predetermined size is set within the angle of view of the photographing section based on the mark, and the control section generates XY coordinates of the virtual screen on the virtual screen area,
    wherein the mark is composed of a light spot irradiated approximately on an object, and the virtual screen area is set by using the light spot photographed by the photographing section as a reference point,
    wherein a distance from the photographing section to the light spot is measured, and the virtual screen area is set within the angle of view of the photographing section based on the measured distance.

4. The presentation device according to claim 3, wherein the mark is composed of a frame-like image of which the position and the size displayed on the monitor is fixed or adjustable, and the virtual screen area is made to correspond with the frame-like image, whereby the virtual screen area is set.

* * * * *